US010422298B2

(12) United States Patent
Deschauer Rejowski et al.

(10) Patent No.: US 10,422,298 B2
(45) Date of Patent: Sep. 24, 2019

(54) CYLINDER LINER FOR INSERTION INTO AN ENGINE BLOCK, AND ENGINE BLOCK

(71) Applicants: Mahle International GmbH, Stuttgart (DE); Mahle Metal Leve S/A, Jundiai-Sp (BR)

(72) Inventors: Edney Deschauer Rejowski, Jundiai-Sp (BR); Rafael B. Rabello, Sao Paulo (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 110 days.

(21) Appl. No.: 15/509,848

(22) PCT Filed: Sep. 8, 2015

(86) PCT No.: PCT/EP2015/070421
§ 371 (c)(1),
(2) Date: Mar. 8, 2017

(87) PCT Pub. No.: WO2016/037996
PCT Pub. Date: Mar. 17, 2016

(65) Prior Publication Data

US 2017/0254287 A1 Sep. 7, 2017

(30) Foreign Application Priority Data

Sep. 9, 2014 (BR) ............................ 102014022261

(51) Int. Cl.
*F16J 10/00* (2006.01)
*F02F 1/00* (2006.01)
(Continued)

(52) U.S. Cl.
CPC .............. *F02F 1/004* (2013.01); *B22D 15/02* (2013.01); *B22D 17/08* (2013.01); *B22D 18/04* (2013.01);
(Continued)

(58) Field of Classification Search
CPC . F02F 1/004; F02F 1/08; F04B 39/126; F04B 53/166; F16J 10/04
USPC ........................................................ 92/169.1
See application file for complete search history.

(56) References Cited

U.S. PATENT DOCUMENTS 3,677,913 A * 7/1972 Passal ...................... C25D 3/14 205/275
5,148,780 A 9/1992 Urano et al.
(Continued)

FOREIGN PATENT DOCUMENTS

CN 102534698 A 7/2012
DE 19745725 A1 1/1999
(Continued)

OTHER PUBLICATIONS

English abstract for EP-2110465.
(Continued)

*Primary Examiner* — Michael Leslie
(74) *Attorney, Agent, or Firm* — Fishman Stewart PLLC

(57) ABSTRACT

A cylinder liner for insertion into an aluminum internal-combustion engine block may include a cylindrical body of cast iron having a circumferential external surface. The cylinder liner may also have a coating deposited on and surrounding the external surface. The external surface may have a specific roughness, and the coating may include at least 98% by volume of pure nickel, and a remainder composed of impurities.

15 Claims, 6 Drawing Sheets

(51) Int. Cl.

| | |
|---|---|
| ***B22D 19/00*** | (2006.01) |
| ***B22D 21/00*** | (2006.01) |
| ***B22D 25/02*** | (2006.01) |
| ***B22D 15/02*** | (2006.01) |
| ***B22D 17/08*** | (2006.01) |
| ***B22D 18/04*** | (2006.01) |

(52) U.S. Cl.

CPC ..... *B22D 19/0009* (2013.01); *B22D 19/0081* (2013.01); *B22D 21/007* (2013.01); *B22D 25/02* (2013.01)

(56) References Cited

U.S. PATENT DOCUMENTS

| | | | | |
|---|---|---|---|---|
| 2011/0154988 | A1 | 6/2011 | Swoboda et al. | |
| 2012/0189864 | A1 | 7/2012 | Bucher | |
| 2016/0002803 | A1 * | 1/2016 | Sklar | C25D 5/14<br>428/621 |

FOREIGN PATENT DOCUMENTS

| | | | |
|---|---|---|---|
| DE | 102010055162 | A1 | 6/2012 |
| EP | 2110465 | A2 | 10/2009 |
| JP | 2008-008209 | A | 1/2008 |

OTHER PUBLICATIONS

English abstract for DE-19745725.
English abstract for JP-S59-30465.
Encyclopedia of Composites (8 pages).
Chinese Office Action in the parallel Chinese Patent application No. 20150045499.0 dated Jun. 1, 2018.

* cited by examiner

CYLINDER LINER FOR INSERTION INTO AN ENGINE BLOCK, AND ENGINE BLOCK

CROSS-REFERENCE TO RELATED APPLICATIONS

This application claims priority to International Patent Application No. PCT/EP2015/070421, filed on Sep. 8, 2015, and Brazilian Patent Application No. BR 10 2014 022261 8, filed on Sep. 9, 2014, both of which are hereby incorporated by reference in their entirety.

TECHNICAL FIELD

The present invention relates to an internal-combustion engine component, especially a cylinder liner for insertion by casting into an aluminum engine block, the circumferential external surface being provided with a coating capable of promoting excellent bonding and heat transfer between the liner and the engine block, irrespective of the casting technology used.

BACKGROUND

Cylinder liners for internal-combustion engines are generally fitted into the engine block by casting the engine block around the circumferential external portion of the liners.

There are currently two processes for casting engine blocks that may be used to insert cylinder liners, namely high-pressure die-casting (HPDC) and low-pressure die-casting (LPDC), also known as gravity die-casting. The major difference between the two types is that the former uses pressure for injecting the aluminum into the mold and consequently the metal is at a lower temperature than in the case of low-pressure die-casting.

Irrespective of the technical solution applied, internal-combustion engine cylinder liners are engine components that undergo significant wear owing to the type of work they perform. The stresses to which they are subject include, in particular, axial stresses on the liner inside the cylinder bore and the ability to transfer combustion heat to the engine block.

Heat transfer and liner sleeve thickness are important factors in minimizing thermal and mechanical distortions during operation. Engines with major distortions tend to present a higher level of wear of their components and also higher levels of oil/fuel consumption and of $CO_2$ emissions. Thus, the increase in heat transfer leads to a variety of beneficial effects since it avoids excess wear of the components and improves the conditions of fuel/oil consumption and of pollutant-gas emission. In addition, it is noted that better heat transfer also allows a reduction in the dimensions of the engine block and consequently in the weight thereof.

In general, cylinder liners are composed of ferrous material, especially cast iron, with more modern engine blocks being cast in aluminum or aluminum alloy, usually with the inclusion of silicon. Thus, the technological field of the present invention comprises cylinder liners of cast iron, engine blocks of any aluminum alloy and high- and low-pressure die-casting.

With a view to solving the inherent technological problems of internal-combustion engines provided with inserted cylinder liners, current technology offers cylinder liners in which the external surface may receive directly, by means of a thermal spray-coating process, a layer of AlSi or, alternatively, an intermediate alloying layer may be deposited.

The aforesaid solution does not successfully solve one of the typical problems arising from casting the alloy of the engine block over the cylinder liners. First, despite a genuine concern to attempt to identify a degree of chemical parity of coating to engine-block alloy through the use of a layer of aluminum with up to 15% silicon, owing to the parity of the alloy the coating has the same melting point (point of transformation from solid phase to liquid phase of the block alloy material). Such a configuration has the disadvantage that, at the point when the molten metal is poured into the engine-block mold and surrounds the cylinder liners, it begins to heat up the material of the liner coating, thereby promoting phase transformation of the coating. Transformation of this type causes the coating material to be entirely consumed by the cast material of the engine block, thereby exposing the ferrous material of the cylinder liner, thereby giving rise to defects—contact failure (voids—see reference 15 in FIG. 3)—in the region of the engine block adjacent the cylinder liners.

These casting defects, known as voids, present the major drawback of compromising the correct transfer of heat, originating from the combustion that takes place inside the cylinder, to the engine block, thus increasing thermal distortions and leading to early wear of the engine or even to seizing of the engine. Moreover, the liner has large liner thicknesses ranging between 1.2 mm and 8.0 mm.

Japanese prior-art document JP2008008209 discloses a hybrid liner that receives a layer of AlSi by means of thermal spray-coating. The engine block that includes one such liner (coated only with AlSi) is produced by means of high-pressure die-casting (HPDC). Thus, this (molten) metal is sprayed at a casting temperature close to the 'liquidus' curve of the AlSi phase diagram since the molten metal solidification time has to be reduced somewhat. Alternatively, if a higher temperature is used, which is typical of low-pressure die-casting (LPDC), the layer added by thermal spray-coating would be entirely liquefied and the benefits of applying an AlSi layer would be lost, giving rise to the typical defects that compromise the heat transfer that is necessary for satisfactory operation of the engine, such defects being empty spaces between the engine block and the cylinder liner (see FIG. 3). These defects are exacerbated when the block is cast using gravity die-casting, i.e. using low-pressure die-casting (LPDC). Thus, the technology disclosed in said Japanese document permits only high-pressure die-casting of the block and does not allow the use of gravity die-casting.

Whatever prior-art solution is used, only partial success will be obtained, and concomitantly the good results not only for engine blocks produced by high-pressure die-casting but also engine blocks produced by low-pressure die-casting will not be achieved.

In addition to the problems mentioned above, it is noted that an AlSi coating, obtained by thermal spray-coating, usually has a thickness in excess of 200/300 microns. The metal of the engine block, upon casting, will consume the coating of the cylinder liner as the injection/pouring temperature thereof is that much higher. Even if it were possible to vary the thickness of the coating in an attempt to prevent its total consumption by melting, which gives rise to the defects mentioned above, this solution is impracticable for two reasons.

Firstly, the increase in thickness makes the coating applied to the cylinder liner more expensive and, secondly, increases the interbore spacing (distance between the center of one liner and the center of the adjacent liner). This measurement is used to quantify the size of an engine block.

The shorter the interbore spacing, the smaller the engine block for the same cylinder diameter.

Alternatively, the coating may likewise be a metal alloy, such as a nickel-phosphorus (NiP) alloy, or a pure metal, such as nickel. Unlike the AlSi coating applied by thermal spray-coating, the nickel-alloy material or pure nickel is a potential solution in the case of low-pressure or gravity die-casting methods, adequate nickel/aluminum diffusion taking place.

Document U.S. Pat. No. 5,148,780 discloses a coating comprising nickel alloys, such as nickel-boron (NiB), nickel-phosphorus (NiP) or nickel-cobalt-phosphorus (NiCoP), applied by deposition, for mechanical components operating in contact with cooling liquids. This coating has anticorrosion and anticavitation properties but does not offer advantages in terms of heat transfer and the presence of voids in the components.

Furthermore, Japanese document JPS59030465 discloses a coating of pure nickel (Ni) or copper (Cu) as alloying element between the cast iron of the cylinder liner and the aluminum of the engine block. In the case of this document, owing to the high melting point of pure nickel (in the region of 1400° C.), diffusion may not occur to an adequate extent when the application method is high-pressure die-casting.

There is therefore a need to find a solution that allows the insertion of cast-iron liners into aluminum-alloy engine blocks using any casting technology (HPDC or LPDC), allowing better bonding between liner and engine block and also better heat transfer and a reduction in the interbore spacing, thereby guaranteeing a high level of internal-combustion engine durability

SUMMARY

The objective of the present invention is to provide a cylinder liner provided with a specific roughness and a coating capable of inhibiting the formation of bonding voids in relation to the engine block, thereby guaranteeing excellent bonding and consequently good heat transfer between the combustion chamber and the engine block.

A further objective of the invention is to provide a cast-iron cylinder liner provided with a coating of pure nickel (Ni99) that can be applied by means of any die-casting method—high- or low-pressure die-casting—thereby enabling the melting point of the coating metal to be altered depending on the method used.

A further objective of the invention is to provide a cylinder liner in which the coating has a thickness of between 10 μm and 20 μm, allowing a reduction in the interbore spacing for the inserted cylinder liners.

The subject of the present invention is a cylinder liner for insertion into an aluminum internal-combustion engine block, the cylinder liner comprising a cylindrical body of cast iron provided with a circumferential external surface surrounded by a coating deposited on the external surface, the external surface being provided with a specific roughness and the coating being composed of at least 98% by volume of pure nickel, the remainder being composed of impurities such as oxygen and/or carbon and/or manganese and/or copper.

The objectives of the invention are, further, achieved by means of the formation of a cylinder liner for insertion into an aluminum internal-combustion engine block, the cylinder liner comprising a cylindrical body of cast iron provided with a circumferential external surface surrounded by a coating deposited on the external surface, the coating having a melting point ranging between 1500° C. and 1700° C. and the engine block having a melting point ranging between 500° C. and 700° C.

Furthermore, the subject of the present invention is an internal-combustion engine comprising at least one cylinder liner as defined above.

BRIEF DESCRIPTION OF THE DRAWINGS

The cylinder liner for insertion into an engine block may be better understood by means of the following detailed description based on the figures listed below.

DETAILED DESCRIPTION

The field of the present invention relates to internal-combustion engines, more particularly the interaction between the cylinder liners 10 and the respective engine block 8. An engine block 8 with inserted liners 10 is achieved by pouring/injecting molten metal around the cylinder liners 10 that have previously been placed in the respective mold. Typically, the metal of the engine block 8 is a light metal, such as aluminum or an aluminum alloy.

The cylinder liner 10 requires its bonding to the engine block 8 to be assured and also the guarantee that, after cooling of the molten metal poured into the mold, regions 15 empty of metal (casting defects) do not arise. As explained in the prior art, guaranteeing such a combination is somewhat complex.

Figure 3:
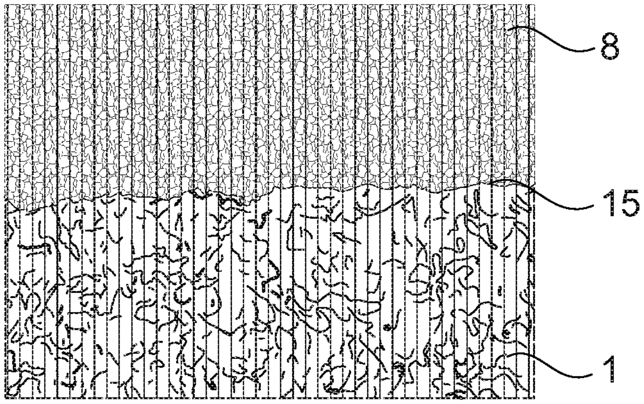
Fig. 3 Prior Art
FIG. 3—photograph of the metallographic structure of a cross section of a prior-art cylinder liner.

In order correctly to understand the present invention, it is necessary to clarify certain concepts and paradigms. As defined above, there are two types of casting for fitting cylinder liners into aluminum-alloy engine blocks 8. High-pressure die-casting, denoted as HPDC, and low-pressure die-casting, denoted as LPDC. HPDC is commonly used and offsets the lower temperature of the aluminum by pressurized injection thereof. In such cases, the coatings 5 tend to be consumed less, since the aluminum cools more rapidly. In the case of LPDC, the coatings, for one and the same thickness, tend to suffer greater wear, giving rise to the defects that are known as voids 15 (see FIG. 3). The technology used for casting the block, in accordance with current concepts, interacts directly with the thickness of the coating 5 and, in turn, with the quality of the heat transfer.

In addition, it is necessary to achieve good bonding between the liner 10 and the engine block 8, which results directly from the chemical parity between the coating 5 and the aluminum alloy of the engine block 8.

Figure 12:
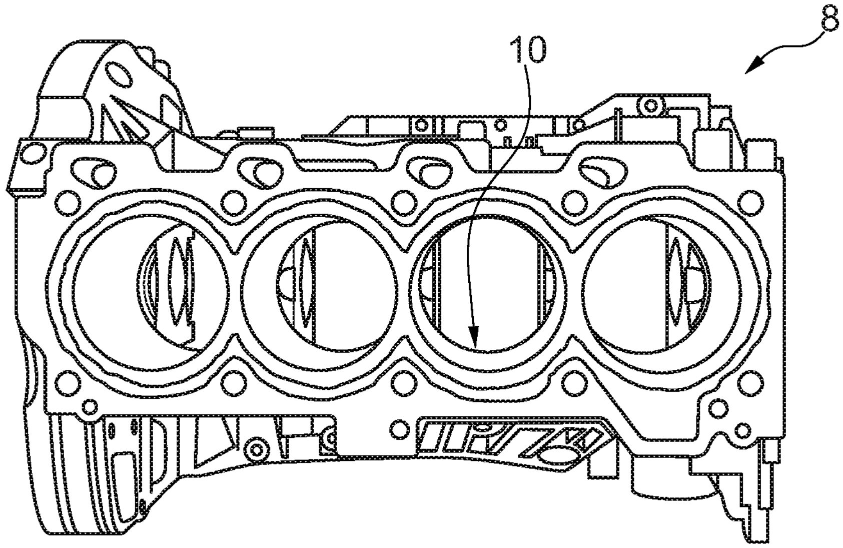
FIG. 12—top view of an engine block with inserted cylinder liners.

Lastly, consideration has to be given to the size of the engine block 8. As is known, the principal producers place pressure on engine designers to minimize engine size, which amounts to saying that they reduce the interbore spacing 12 (see FIGS. 12 and 13). Thus, any reduction in the thickness of the coating 5 leads to a reduction in the interbore spacing 12. Taking account of the fact that, in LPDC, prior-art coatings have to be thicker in order for voids 15 not to be generated, the existence of a coating 5 that successfully reduces the interbore spacing 12 and at the same time is thinner and furthermore thus allows insertion of the liner 10 using either of the two die-casting technologies (HPDC and LPDC) is a doubly advantageous solution.

Figure 1:
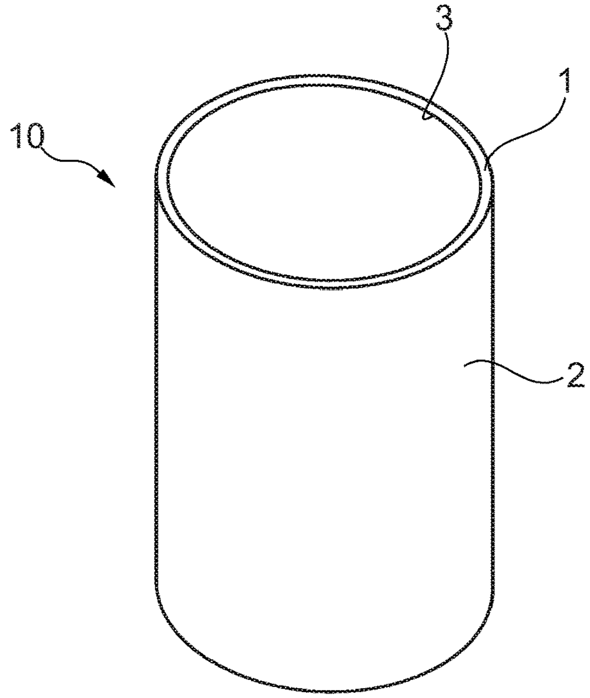
FIG. 1—perspective view of a cylinder liner.
Figure 2:
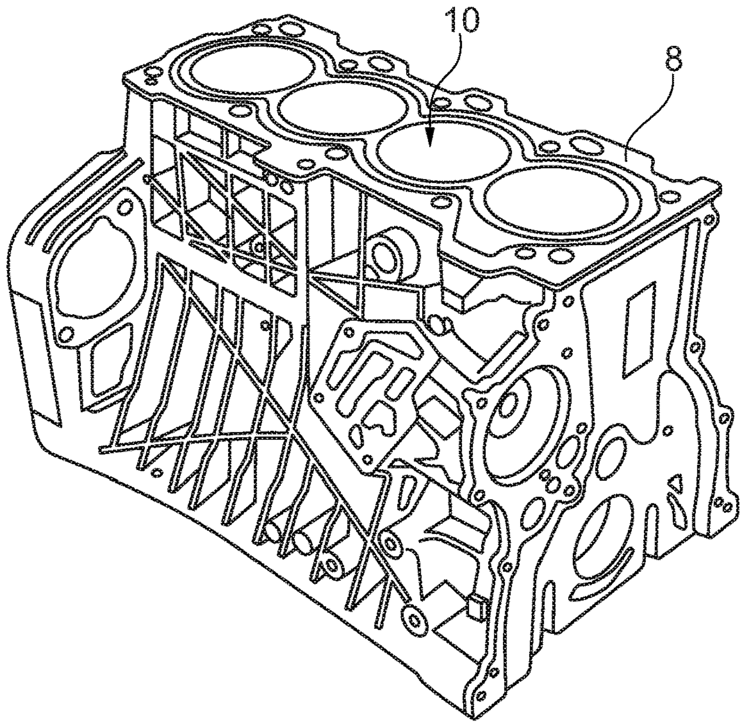
FIG. 2—perspective view of an engine block provided with cylinder liners.

As shown in FIG. 1, a cylinder liner 10 is provided with a hollow cylindrical body or tube 1, generally constituted from a ferrous alloy, such as cast iron or grey cast iron. This cylindrical body 1 provides two surfaces, in particular the internal surface 3 where a piston will move axially and the circumferential external surface 2. It is this external region that will be surrounded by the molten metal of the engine block 8, but only after its external surface 2 has been subjected to the coating 5, thereby configuring the present invention.

The coating 5 of the present invention is applied directly to the external surface 2, the latter being constituted from pure nickel (Ni99) with the remainder comprising impurities. In other words, the nickel applied is that known commercially as Ni99, i.e. the most pure nickel capable of being applied as a coating, the fact remaining, that, despite the purity thereof being fairly high, there will always be a small percentage of impurities. However, these impurities do not affect the creation of the layer that alloys with the engine block 8 (see FIG. 4). As a preferred embodiment, the coating 5 is composed of at least 98% by volume of pure nickel, the remainder being composed of impurities such as oxygen and/or carbon and/or manganese and/or copper.

This coating 5 is applied by means of an electrodeposition process. It should be noted that the use of the electrodeposition application process for the coating 5 is one of the principal guarantees of the results of the present invention. In the prior art, use is normally made of thermal spray-coating processes, which result in coating thicknesses in excess of 200 μm. With electrodeposition, however, it is possible to provide coatings with thicknesses that range, preferably, between 3 μm and 20 μm or, preferably, 3 μm to 10 μm, i.e. a value 10% below that achieved by the prior art. By itself, this characteristic already very significantly guarantees the reduction in the interbore spacing 12 and, by reducing the thickness of the coating 5, also reduces the cost involved in this step.

Figure 6:
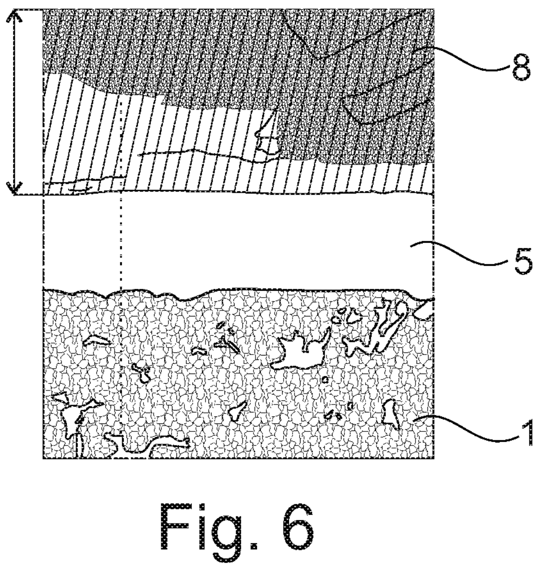
FIG. 6—photograph of the metallographic structure of a cross section of a cylinder liner of the present invention.
Figure 7:
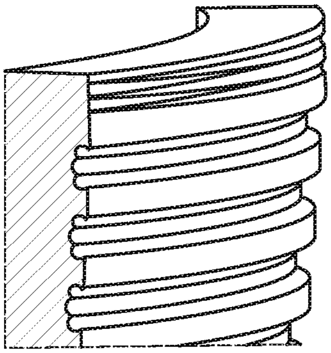
FIG. 7—photograph of a cylinder liner provided with an external surface with an undulation profile.
Figure 8:
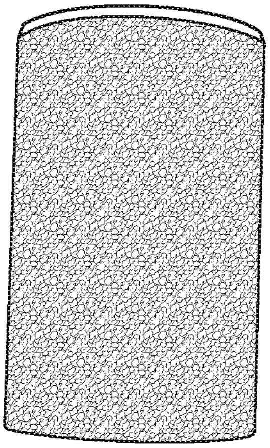
FIG. 8—photograph of a cylinder liner provided with a rough external surface.
Figure 9:
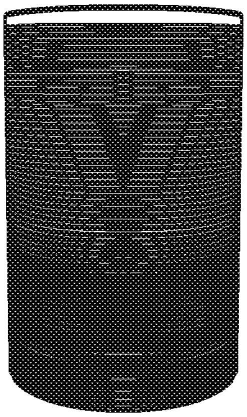
FIG. 9—photograph of a cylinder liner provided with an external surface with thread profile.

The coating 5 of the present invention will be applied to a cylinder liner 10 with a specific roughness, as shown in FIGS. 6, 7, and 8, it being possible for this external surface 2 to comprise a surface with undulations (see FIG. 7), a rough surface (see FIG. 8) or a surface with a thread profile (see FIG. 9). These surfaces 2, with specific roughness, help to increase the bonding strength and transfer of heat between the liner 10 and the engine block 8, as shown in prior-art document US2011/0154988, from the current applicant.

The application of a coating 5 of pure nickel is already known in the prior art in the case of smooth liners 10. However, this application results in the formation of a diffusion layer 6 (see FIG. 5) between the aluminum of the engine block 8 and the cast iron of the liner 10, forming a fragile intermetallic compound (iron-nickel-aluminum), which may suffer fracture during operation of the engine.

The present invention uses a liner 10 provided with an external surface 2 with a specific roughness, which results in a greater area of contact between the aluminum of the engine block 8 and the cast-iron liner 10, and a turbulent material flow is introduced during casting, thereby reducing the time of contact between the aluminum and the external surface 2, which thus prevents the formation of a diffusion layer 6, resulting only in filling of the casting gaps and consequently bonding of the liner 10 to the block 8.

The absence of a diffusion layer 6 and the coating 5 of pure nickel guarantee exponential gains in terms of bonding for the liner 10. As may be seen in FIG. 10, the liner 10 with a specific roughness on the external surface 2 bonds twice as strongly when a roughness of 70 μm is used as compared to a roughness of under 60 μm. Furthermore, when a roughness of 90 μm is used, the liner 10 offers 30 times as much bonding strength as compared to the liner 10 with a roughness of less than 60 μm.

Figure 10:
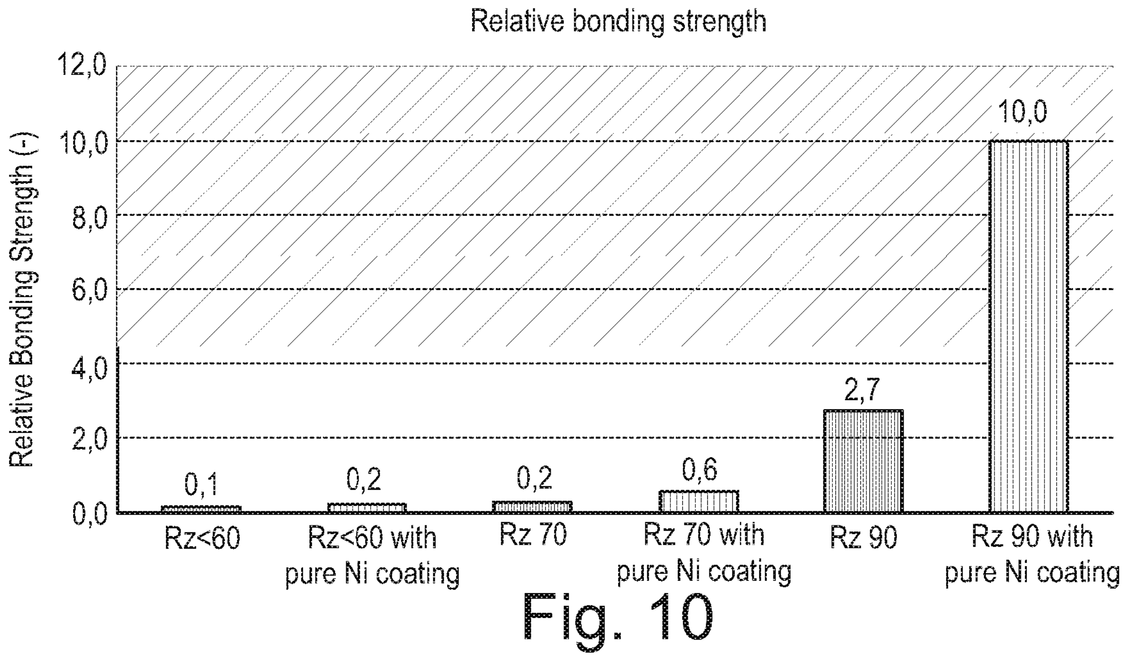
FIG. 10—representation of a graph defining the bonding force for cylinder liners with different roughnesses.

Moreover, FIG. 10 shows the exponential increase in the bonding of the liner 10 when the application of the coating 5 of nickel is combined with the roughness of the liner 10. The liner 10 with the coating of nickel has its bonding strength increased three-fold when a roughness of less than 60 μm is increased to 70 μm and, furthermore, when a roughness of below 60 μm is increased to 90 μm bonding of the liner 10 is 55 times as strong, i.e. bonding is obtained that is 25 times as strong as compared to the liner 10 with roughness only and without the application of the coating 5 of nickel.

Figure 5:
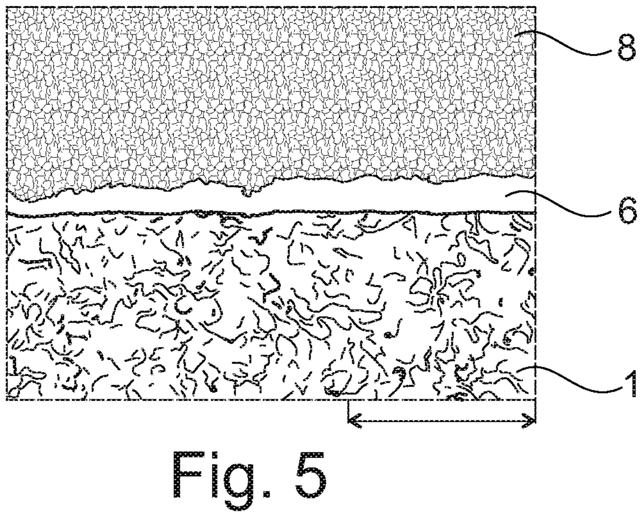
FIG. 5—photograph of the metallographic structure of a cross section of a cylinder liner, showing the diffusion layer.

As may be seen in FIG. 5, the diffusion layer 6 is formed upon application of the coating 5 of nickel to a liner 10 with an external surface 2 provided with a roughness of less than 60 μm. The formation of this diffusion layer 6 results in poorer bonding of the liner 10 to the block 8 and moreover allows the possibility of fractures occurring during the period of operation of the engine.

Meanwhile, FIG. 6 shows a liner 10 provided with an external surface 2 with a roughness greater than 60 μm, preferably a roughness of 70 μm, and more preferably a roughness of 90 μm. In this case, there is no diffusion layer 6, which thus increases bonding of the liner 10 to the block 8 and further eliminates the occurrence of fractures.

Figure 11:
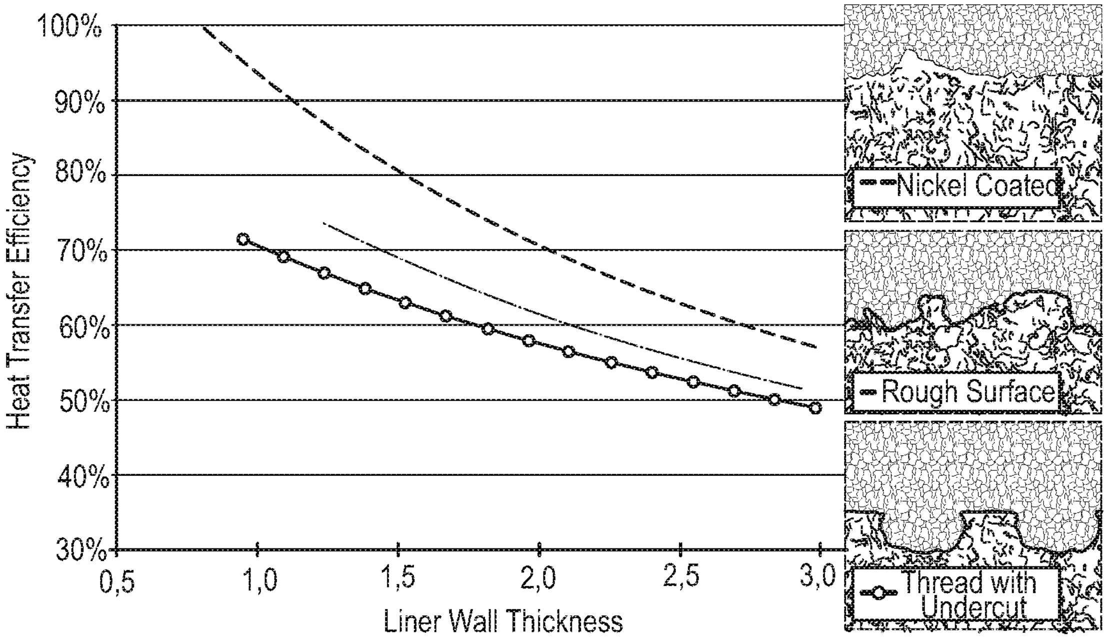
FIG. 11—representation of a graph defining heat transfer in the case of different types of coating applied to a cylinder liners.

In connection with the efficiency of heat transfer, FIG. 11 clearly shows that this efficiency increases by 20% when the liner 10 comprises the coating 5 of Ni99 as compared to other liners 10 that do not include any type of coating.

FIG. 11 shows that the present invention offers a clear advantage in terms of heat transfer as compared to the prior art, and in turn promotes better control of distortion of the bore of the cylinder liner 10 and also improved clearance between piston and liner 10. This results in a reduction in the consumption of lubricating oil and in the consumption of fuel (considering the lower loads tangential to the ring in order to reduce attrition) and, consequently, lower $CO_2$ emissions.

The advantage of a coating of pure nickel (Ni99) over all existing prior-art coatings is connected to the roughness of the surface and the difference between the melting point of the pure nickel of the coating 5 of the liner 10, which ranges between 1500° C. and 1700° C., and the melting point of the aluminum alloy of the engine block 8, which ranges between 500° C. and 700° C. This difference in temperatures, allied with roughness, guarantees greater bonding strength when the liner 10 is inserted into the engine block 8.

Figure 4:
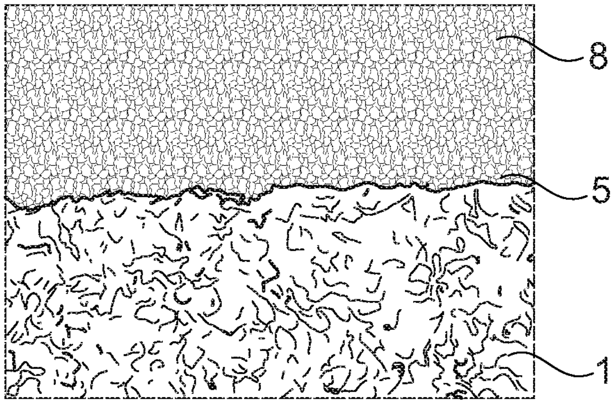
FIG. 4—photograph of the metallographic structure of a cross section of a cylinder liner of the present invention.

It should be noted, further, that the present invention successfully promotes the insertion of liners 10 without voids 15, as may be seen from FIG. 4.

The concept of the present invention is thus an alternative for modern engines in which the engine block 8 uses an aluminum alloy. As the thickness of the coating 5 is fairly thin, for example 10 μm or 12 μm (see FIG. 4), satisfactory bonding of the liner 10 combined with the low external diameter tolerances of the liner 10 allow the design of compact engine blocks 8, i.e. with a shorter interbore spacing 12.

Figure 13:
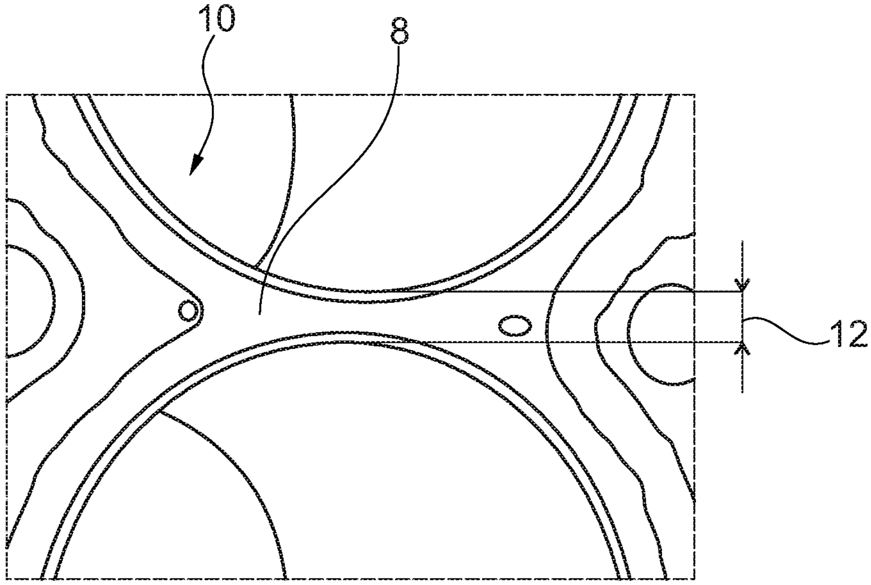
FIG. 13—top view of a detail of the engine block, showing the distance between the inserted cylinder liners.

In comparison to the thermal spray-coating process used in the prior art, which requires coatings with thicknesses of close on 200 μm owing to the specific characteristics of the process, the present invention uses, for example, a coating of 10 μm, and this difference results in a reduction in the interbore spacing of the cylinders (see FIG. 13).

This reduction gives rise to a considerable reduction in the weight of the engine block 8, which is the major objective of principal producers on account of the advantages mentioned above.

Preferred illustrative embodiments having been described, it should be understood that the scope of the present invention encompasses other possible variations, and is limited only by the content of the appended claims that include possible equivalents.

The invention claimed is:

1. A cylinder liner for insertion into an aluminum internal-combustion engine block, the cylinder liner comprising:

- a cylindrical body of cast iron having a circumferential external surface; and
- a coating deposited on and surrounding the external surface;
- wherein the external surface has a specific roughness, and the coating includes at least 98% by volume of pure nickel, and a remainder composed of impurities including at least one of oxygen, carbon, manganese, and copper; and
- wherein the specific roughness ranges from greater than 60 μm to 90 μm and
- wherein the coating has a thickness ranging between 3 μm and 20 μm.

2. The cylinder liner as claimed in claim 1, wherein the coating is applied by electrodeposition.

3. The cylinder liner as claimed in claim 1, wherein the cylinder liner is insertable into an engine block by one of high-pressure die-casting (HPDC), low-pressure die-casting (LPDC), or gravity die-casting.

4. The cylinder liner as claimed in claim 1, wherein the specific roughness is 70 μm.

5. The cylinder liner as claimed in claim 1, wherein the specific roughness is 90 μm.

6. The cylinder liner as claimed in claim 1, wherein the coating ranges between 3 μm and 10 μm.

7. A cylinder liner for insertion into an aluminum internal-combustion engine block, the cylinder liner comprising:

- a cylindrical body of cast iron having a circumferential external surface; and
- a coating deposited on and surrounding the external surface;
- wherein the coating has a melting point ranging between 1500° C. and 1700° C. and the engine block has a melting point ranging between 500° C. and 700° C.

8. An internal-combustion engine comprising an engine block and at least one cylinder liner including:

- a cylindrical body of cast iron having a circumferential external surface; and
- a coating deposited on and surrounding the external surface;
- wherein the external surface has a specific roughness, and the coating includes at least 98% by volume of pure nickel, and a remainder composed of impurities; and
- wherein the engine block has a melting point ranging between 500° C. and 700° C.;
- wherein the specific roughness ranges from greater than 60 μm to 90 μm; and
- wherein the coating has a thickness ranging between 3 μm and 20 μm.

9. The internal-combustion engine as claimed in claim 8, wherein the impurities include at least one of oxygen, carbon, manganese, and copper.

10. The internal-combustion engine as claimed in claim 8, wherein the specific roughness is 70 μm.

11. The internal-combustion engine as claimed in claim 8, wherein the specific roughness is 90 μm.

12. The internal-combustion engine as claimed in claim 8, wherein the coating is applied by electrodeposition.

13. The internal-combustion engine as claimed in claim 8, wherein the thickness ranges between 3 μm and 10 μm.

14. The internal-combustion engine as claimed in claim 8, further comprising an engine block, wherein the cylinder liner is insertable into the engine block by one of high-pressure die-casting (HPDC), low-pressure die-casting (LPDC), or gravity die-casting.

15. The internal combustion engine as claimed in claim 8, wherein the coating has a melting point ranging between 1500° C. and 1700° C.

* * * * *